(12) United States Patent
Yamagiwa et al.

(10) Patent No.: US 9,564,118 B2
(45) Date of Patent: Feb. 7, 2017

(54) SOUND INSULATING STRUCTURE

(71) Applicant: Kobe Steel, Ltd., Hyogo (JP)

(72) Inventors: Ichiro Yamagiwa, Hyogo (JP); Zenzo Yamaguchi, Hyogo (JP); Akio Sugimoto, Aichi (JP); Yoshikazu Mukai, Aichi (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 14/769,555

(22) PCT Filed: Feb. 26, 2014

(86) PCT No.: PCT/JP2014/054743
§ 371 (c)(1),
(2) Date: Aug. 21, 2015

(87) PCT Pub. No.: WO2014/133033
PCT Pub. Date: Sep. 4, 2014

(65) Prior Publication Data
US 2016/0012811 A1    Jan. 14, 2016

(30) Foreign Application Priority Data

Feb. 27, 2013   (JP) ................................. 2013-037679

(51) Int. Cl.
*G10K 11/168*    (2006.01)
*B60R 13/08*    (2006.01)
(Continued)

(52) U.S. Cl.
CPC ............... *G10K 11/16* (2013.01); *B60N 3/048* (2013.01); *B60R 13/08* (2013.01); *G10K 11/168* (2013.01); *G10K 11/172* (2013.01)

(58) Field of Classification Search
CPC .. B60R 13/08; B60R 13/0815; B60R 13/0823; G10K 11/16; G10K 11/168
(Continued)

(56) References Cited

U.S. PATENT DOCUMENTS 3,103,255 A * 9/1963 Boschi ................... E04B 9/001
                                                                        181/293
4,416,349 A * 11/1983 Jacobs ................... G10K 11/16
                                                                        181/208
(Continued)

FOREIGN PATENT DOCUMENTS

FR      2913648 A1 * 9/2008 ............ B60P 7/0815
GB      1125533 A  * 8/1968 ......... B60R 13/0815
(Continued)

OTHER PUBLICATIONS

International Search Report and Written Opinion of the International Searching Authority, PCT/JP2014/054743, Apr. 1, 2014.

*Primary Examiner* — Edgardo San Martin
(74) *Attorney, Agent, or Firm* — Studebaker & Brackett PC

(57) ABSTRACT

This sound insulating structure (1) is provided with: a panel (2); a sound insulating material (3) laminated to the panel (2); a reinforcing material (4) provided between the panel (2) and the sound insulating material (3) and bonded to the panel (2); and an air layer (S) formed between the panel (2) and the reinforcing material (4). The reinforcing material (4) has a plurality of through-holes (5). As a result, it is possible to suppress an increase in overall weight and to secure sound shielding properties and sound insulating properties

1 Claim, 4 Drawing Sheets

(51) Int. Cl.
*G10K 11/16* (2006.01)
*B60N 3/04* (2006.01)
*G10K 11/172* (2006.01)

(58) Field of Classification Search
USPC .............. 181/290, 295, 285, 286, 204, 205
See application file for complete search history.

(56) References Cited

U.S. PATENT DOCUMENTS

| | | | |
|---|---|---|---|
| 6,305,494 B1 * | 10/2001 | Pfaffelhuber | G10K 11/172 181/286 |
| 6,568,135 B1 * | 5/2003 | Yokoyama | E01F 8/0094 181/208 |
| 7,654,364 B2 * | 2/2010 | Yamaguchi | B32B 3/266 181/293 |
| 7,743,884 B2 * | 6/2010 | Thomas | B64C 1/40 181/292 |
| 8,499,887 B2 * | 8/2013 | Gleine | B60R 13/0815 181/292 |
| 8,820,476 B2 * | 9/2014 | Nam | E04B 2/7409 181/284 |
| 2006/0131104 A1 * | 6/2006 | Yamaguchi | B60R 13/08 181/293 |
| 2007/0085364 A1 * | 4/2007 | Sato | B60R 13/0815 296/39.3 |
| 2015/0211226 A1 * | 7/2015 | Yawagiwa | G10K 11/168 181/292 |

FOREIGN PATENT DOCUMENTS

| | | | |
|---|---|---|---|
| JP | 06247202 A | | 9/1994 |
| JP | 2002002352 A | | 1/2002 |
| JP | 2004062074 A | | 2/2004 |
| JP | 2004264372 A | | 9/2004 |
| JP | 2005099789 A | | 4/2005 |
| JP | 2005282321 A | * | 10/2005 |
| JP | 2006199276 A | | 8/2006 |
| JP | 2007302243 A | | 11/2007 |
| JP | 2008044459 A | | 2/2008 |
| JP | 2011152918 A | | 8/2011 |
| JP | 2012013912 A | | 1/2012 |

\* cited by examiner

FIG.2
(a)
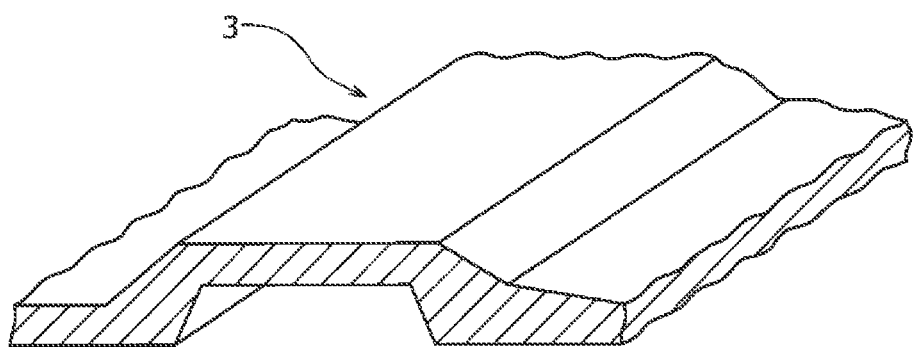
(b)
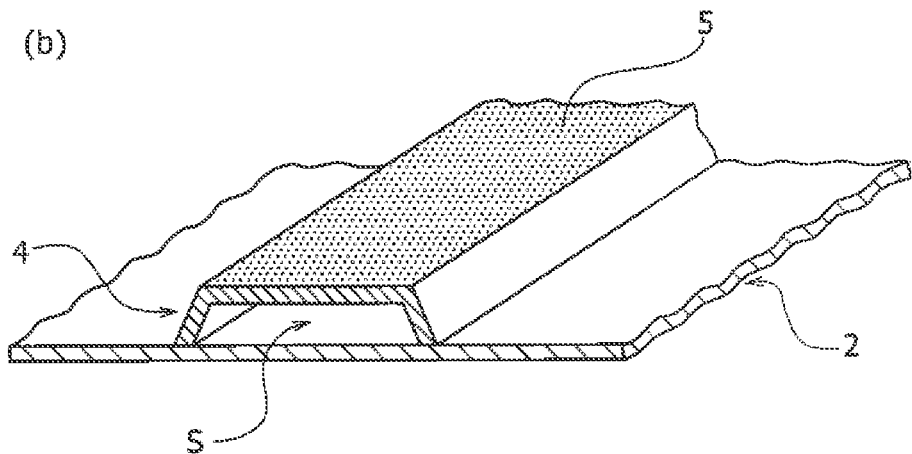

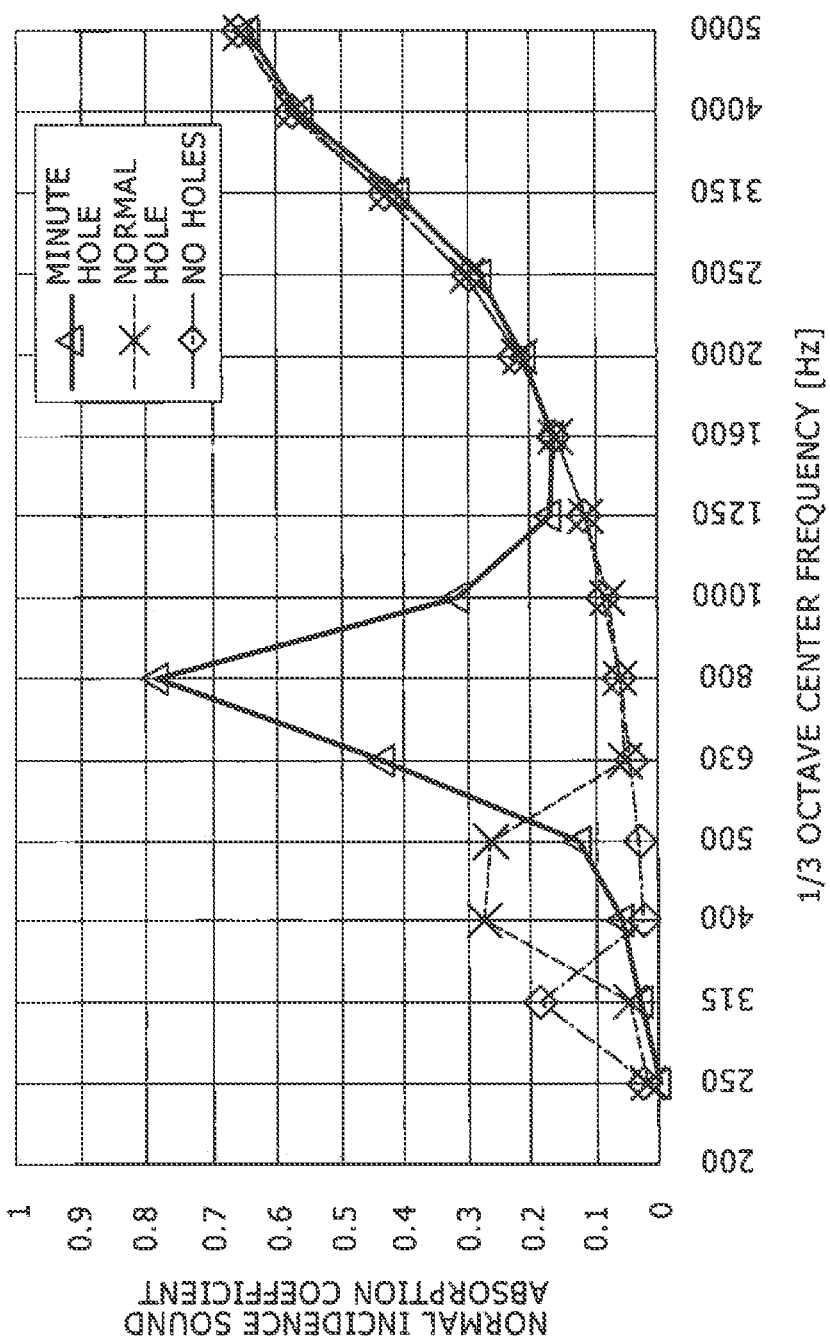
F I G. 3

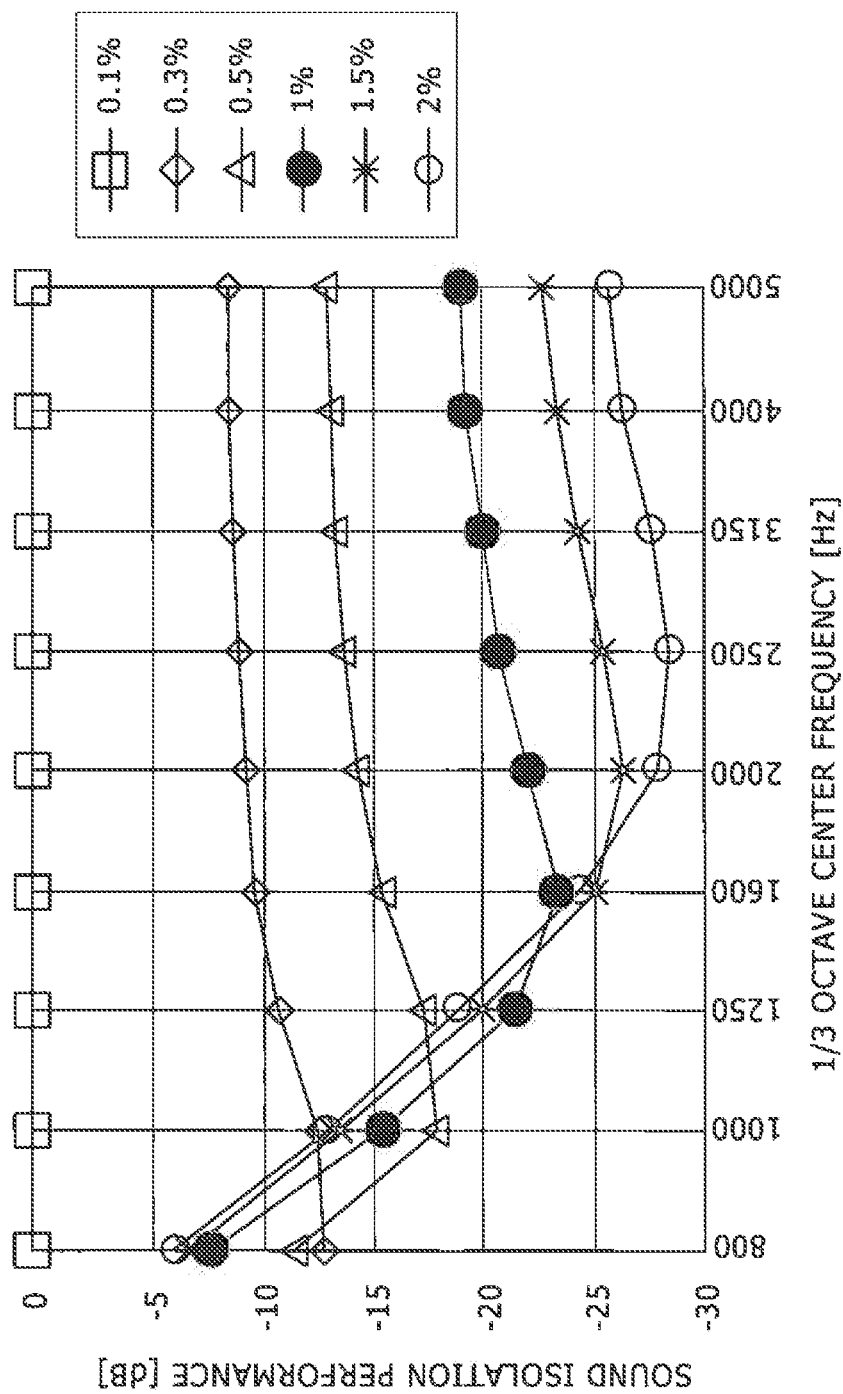

SOUND INSULATING STRUCTURE

TECHNICAL FIELD

The present invention relates to a sound insulating structure.

BACKGROUND ART

As a conventional sound insulating structure, for example, there is one described in Patent Document 1. An automobile floor carpet described in Patent Document 1 is formed by pressing a mat shaped material.

As another sound insulating structure, for example, there is one described in Patent Document 2. An automobile floor carpet described in Patent Document 2 is formed by laminating a plurality of buffer materials having different density and being made of different materials.

CITATION LIST

Patent Document

Patent Document 1: JP 2002-2352 A
Patent Document 2: JP 6-247202 A

SUMMARY OF THE INVENTION

Problems to be Solved by the Invention

In the sound insulating structure described in Patent Documents 1 and 2, a sound isolation property is determined by weight of a sound insulating material. Therefore, since a heavy sound insulating material has to be used in order to obtain a high sound isolation property, the total weight of the sound insulating structure is increased.

In order to enhance the sound isolation property, a sound insulating material made of a low aeration property has to be used. However, when the sound insulating material made of a low aeration property is used, a sound absorption property of the sound insulating structure is lowered. Thereby, there is a fear that a silencing property obtained by the sound insulating structure is lowered.

The present invention is achieved in consideration of the above circumstance and an object thereof is to provide a sound insulating structure in which an increase in the total weight of the sound insulating structure can be suppressed and a sound absorption property and a sound isolation property can be ensured.

Means for Solving the Problems

The present invention is a sound insulating structure. This sound insulating structure includes a panel, a sound insulating material laminated on the panel, a reinforcing material provided between the panel and the sound insulating material and bonded to the panel, and an air layer formed between the panel and the reinforcing material. The reinforcing material has a large number of through holes.

Effects of the Invention

In the present invention, an increase in the total weight of the sound insulating structure can be suppressed and a sound absorption property and a sound isolation property can be ensured.

BRIEF DESCRIPTION OF DRAWINGS

FIG. 2(a) is a perspective view of a sound insulating material 3 of FIG. 1, and FIG. 2(b) is a perspective view of a panel 2 and a reinforcing material 4 of FIG. 1.

FIG. 3 is a graph showing a relationship between a ⅓ octave center frequency and a normal incidence sound absorption coefficient.

FIG. 4 is a graph showing a relationship between the ⅓ octave center frequency and a sound isolation performance.

DESCRIPTION OF EMBODIMENTS

Figure 1:
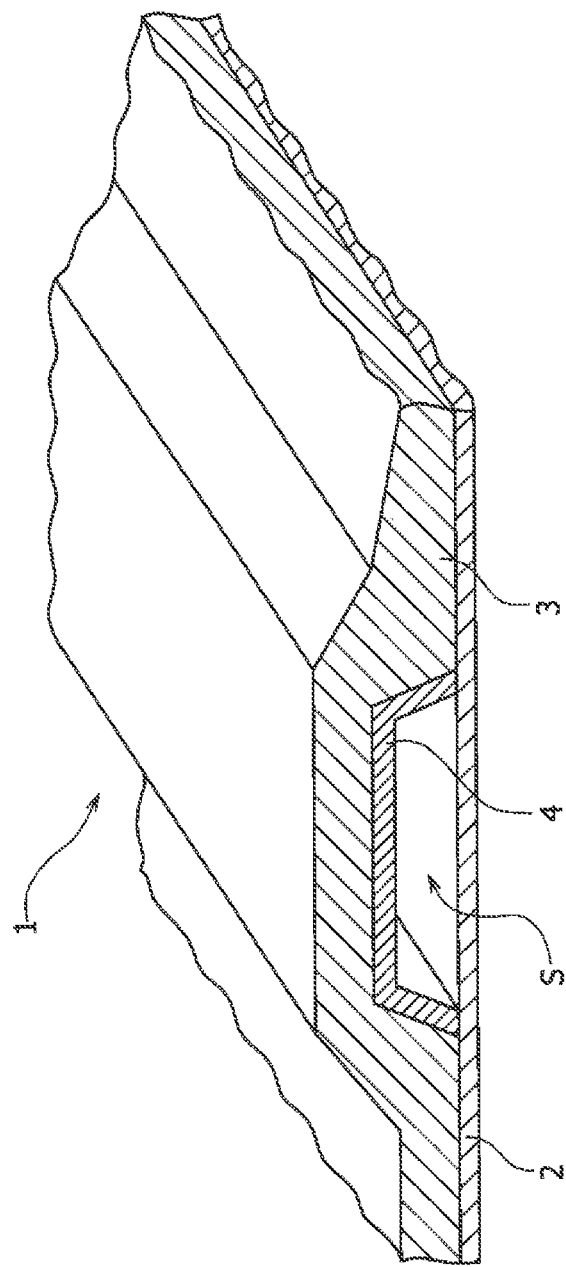
FIG. 1 is a perspective view showing the entire configuration of a sound insulating structure according to one embodiment of the present invention.

Hereinafter, a sound insulating structure 1 of an embodiment of the present invention will be described with reference to the drawings.

As shown in FIG. 1, the sound insulating structure 1 is for sound absorption and sound isolation. The sound insulating structure 1 is provided in for example an automobile (may be provided in an item other than the automobile). The sound insulating structure 1 partitions a vehicle interior and a vehicle exterior. The sound insulating structure 1 is provided in for example a floor part that partitions an exterior part of the automobile and the vehicle interior. For example, the sound insulating structure 1 may be provided in a dash panel part that partitions an engine room and the vehicle interior, or the like. The sound insulating structure 1 includes a panel 2, a sound insulating material 3, and a reinforcing material 4.

(Panel)
The panel 2 is a plate shaped member.
(Sound Insulating Material)
The sound insulating material 3 is laminated on the panel 2. The sound insulating material 3 is arranged on the vehicle interior inner side of the panel 2. In addition to the vehicle interior inner side of the panel 2, the sound insulating material 3 may also be arranged on the vehicle interior outer side (may be laminated on the panel 2). The sound insulating material 3 is attached to the panel 2. A gap may exist between the sound insulating material 3 and the panel 2. A material of the sound insulating material 3 is a fiber material or a composite material. The fiber material includes for example felt and glass wool. The composite material is formed for example by placing a skin material (such as a PVC sheet, an EVA sheet, and an EPDM sheet) over a surface of an expanded foam material such as an expanded urethane foam.

(Reinforcing Material)
The reinforcing material 4 is to reinforce the panel 2. The reinforcing material 4 is arranged between the panel 2 and the sound insulating material 3. The reinforcing material 4 is bonded to the panel 2. This bonding is made by for example welding or the like. An enclosed or substantially-enclosed air layer S is formed between the reinforcing material 4 and the panel 2 (excluding a part of through holes 5 to be described later). That is, the reinforcing material 4 is arranged in such a manner that a gap is formed between the reinforcing material 4 and the panel 2. The reinforcing material 4 projects from the panel 2 to the side of the sound insulating material 3.

A section of the reinforcing material 4 bulging on the side of the sound insulating material 3 (the vehicle interior inner side) with respect to the panel 2 is formed in a substantially U shape. It should be noted that as long as the air layer S is formed between the reinforcing material 4 and the panel 2, the reinforcing material 4 may be formed in any shape. For example, the section of the reinforcing material 4 bulging on the side of the sound insulating material 3 (the vehicle interior inner side) with respect to the panel 2 may be formed in a semi-circular shape, an arc shape, an arch shape, or the like. The reinforcing material 4 is attached to the sound insulating material 3 (may be not attached). The reinforcing material 4 is in contact with the sound insulating material 3. A gap may exist (entirely or partially) between the reinforcing material 4 and the sound insulating material 3. Thickness t (mm) of the reinforcing material 4 is 0.8≤t≤1.2. A material of the reinforcing material 4 is metal. This metal includes for example, aluminum, an aluminum alloy, and iron. The through holes 5 are provided in the reinforcing material 4 as shown in FIG. 2(b).

A large number of through holes 5 are provided in the reinforcing material 4. The through holes 5 are provided on the entire surface or part of the reinforcing material 4. For example, the through holes 5 are provided on a part of a surface forming the reinforcing material 4, the part being in parallel with the panel 2. A hole diameter d (mm) of the through holes 5 is 0.7t≤d≤1.3t. The hole diameter indicates a diameter of the hole. It should be noted that in a case where a shape of the through hole 5 when seen from the thickness direction of the reinforcing material 4 is not a circular shape, a diameter of a circle having an equal area to an area of the (non-circular) through hole 5 when seen from the same direction serves as the "hole diameter".

(Evaluation of Influence of Difference in Hole Diameter on Sound Absorption Property)

FIG. 3 is a graph showing sound absorption coefficients (normal incidence sound absorption coefficients) of a sound insulating structure of a comparative example and of the sound insulating structure 1, respectively. The sound absorption coefficients of the following sound absorption structures were examined.

[Through Hole A]: the sound insulating structure 1 in which the through holes 5 are minute holes (hole diameter of 1 mm).

[Through Hole B]: the sound insulating structure 1 in which the through holes 5 are normal holes (hole diameter of 10 mm).

[No Holes] (comparative example): the sound absorption structure in which no through holes 5 are provided in the reinforcing material 4 (the other configurations are the same as those of the sound insulating structure 1).

An aperture ratio of the through holes 5 provided in the reinforcing material is 0.3% (excluding [No Holes]).

When [Through Hole A] and [No Holes] are compared with each other, in a frequency region of about 400 Hz or higher and less than 1,600 Hz, a sound absorption coefficient of [Through Hole A] is larger than that of [No Holes]. When [Through Hole A] and [Through Hole B] are compared with each other, in a frequency region of about 630 Hz or higher and less than 1,600 Hz, the sound absorption coefficient of [Through Hole A] is larger than that of [Through Hole B]. In a frequency region of 1,600 Hz or higher, there is almost no difference in the sound absorption coefficient between [No Holes], [Through Hole B], and [Through Hole A].

From the graph, it is found that the smaller the hole diameter of the through holes 5 is, the higher a sound absorption property of a low frequency band (less than about 1,600 Hz) is. Therefore, the smaller the hole diameter of the through holes 5 is, the more a frequency range where the sound absorption property is large (for example, with the normal incidence sound absorption coefficient of 0.3 or more) can be widen.

(Evaluation of Influence of Difference in Aperture Ratio on Sound Isolation Property)

FIG. 4 is a graph showing a difference in a sound isolation performance between the through holes 5 having various aperture ratios on the basis of a case where the aperture ratio of the through holes 5 is 0.1%. The aperture ratios to be compared are 0.1%, 0.3%, 0.5%, 1%, 1.5%, and 2%. The hole diameter of the respective through holes 5 is 1 mm. The smaller value of the sound isolation performance shown in the graph indicates the lower sound isolation performance in comparison to a case where the aperture ratio is 0.1%.

(Operation and Effect 1)

As shown in FIG. 1, the sound insulating structure 1 of the present embodiment includes the panel 2, the sound insulating material 3 laminated on the panel 2, the reinforcing material 4 provided between the panel 2 and the sound insulating material 3 and bonded to the panel 2, and the air layer S.

[Configuration 1] The air layer S is formed between the panel 2 and the reinforcing material 4. As shown in FIG. 2(b), the reinforcing material 4 has a large number of through holes 5.

With the above [Configuration 1], the sound absorption property is provided. Therefore, in comparison to the conventional structure (structure in which the panel 2 and the sound insulating material 3 are laminated and the through holes 5 and the air layer S are not provided), the sound absorption property can be improved. As a result, a sound isolation property of the sound insulating structure 1 can be improved. Thereby, even when the sound absorption property of the sound insulating material 3 and the sound isolation property are lowered, the sound absorption property and the sound isolation property which are equal to or more than the above "conventional structure" can be ensured. Therefore, while ensuring the sound absorption property and the sound isolation property, the lightweight and thin sound insulating material 3 can be adopted. As a result, an increase in the total weight of the sound insulating structure 1 can be suppressed. Thereby, in a case where the sound insulating structure 1 is applied to an automobile, an increase in the total weight of this automobile can be suppressed.

(Operation and Effect 2)

[Configuration 2] The thickness t (mm) of the reinforcing material 4 is 0.8≤t≤1.2. The hole diameter d (mm) of the through holes 5 provided in the reinforcing material 4 is 0.7t≤d≤1.3t.

As described above, the smaller the hole diameter of the through holes 5 is, the higher the sound absorption property of the low frequency band is. Therefore, by providing the through holes 5 having a small hole diameter (through holes 5 satisfying the condition of the above [Configuration 2]), the sound absorption property of the low frequency band can be enhanced in comparison to the through holes 5 having a large hole diameter (through holes of d>1.3t). As a result, the frequency range where the sound absorption property is large can be widen.

The through holes 5 having a small hole diameter can reduce oscillating radiated sound in comparison to the through holes 5 having a large hole diameter. Therefore, by providing the through holes 5 having a small hole diameter, the sound isolation property can be improved.

(Operation and Effect 3)

[Configuration 3] The aperture ratio of the through holes 5 is 1% or less.

As described above, the smaller the aperture ratio of the through holes 5 is, the higher the sound isolation property is. Therefore, with the above [Configuration 3], the sound isolation property can be improved in comparison to a case where the aperture ratio is large (case where the aperture ratio exceeds 1%).

(Operation and Effect 4)

[Configuration 4] The aperture ratio of the through holes 5 is 0.3% or less.

As described above, the smaller the aperture ratio of the through holes 5 is, the higher the sound isolation property can be made. Therefore, with the above [Configuration 4], the sound isolation property can be more improved.

The present invention is described in detail with reference to the particular embodiment. However, it is clear for those skilled in the art that various modifications and corrections can be added without departing from the spirit and the scope of the present invention.

The present application is based on the Japanese Patent application (Japanese Patent Application No. 2013-037679) filed in Feb. 27, 2013, and contents thereof are taken herein as a reference.

INDUSTRIAL APPLICABILITY

The sound insulating structure of the present invention is useful for an automobile floor carpet, a dash panel part, and the like, and the increase in the total weight can be suppressed and the sound absorption property and the sound isolation property can be ensured.

EXPLANATION OF REFERENCE NUMERALS

1: Sound insulating structure
2: Panel
3: Sound insulating material
4: Reinforcing material
5: Through hole
S: Air layer

The invention claimed is:

1. A sound insulating structure, comprising:
a panel;
a sound insulating material laminated on said panel;
a reinforcing material provided between said panel and said sound insulating material and bonded to said panel; and
an air layer formed between said panel and said reinforcing material, wherein
the reinforcing material has a large number of through holes,
thickness t (mm) of said reinforcing material is $0.8 \leq t \leq 1.2$, and
a hole diameter d (mm) of the through holes provided in said reinforcing material is $0.7t \leq d \leq 1.3t$.

* * * * *